(No Model.)

C. D. ROGERS.
WIRE NAIL.

No. 364,301. Patented June 7, 1887.

WITNESSES,
Charles H. Hannigan
Joseph Sanford

INVENTOR,
Charles D. Rogers.
by Remington & Henthorn
Attys.

UNITED STATES PATENT OFFICE.

CHARLES D. ROGERS, OF PROVIDENCE, RHODE ISLAND.

WIRE NAIL.

SPECIFICATION forming part of Letters Patent No. 364,301, dated June 7, 1887.

Application filed August 6, 1886. Serial No. 210,165. (No model.)

*To all whom it may concern:*

Be it known that I, CHARLES D. ROGERS, a citizen of the United States, residing at Providence, in the county of Providence and State of Rhode Island, have invented certain new and useful Improvements in Wire Nails; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My present invention relates to certain novel improvements in wire nails, more particularly nails made from steel wire; and it consists, essentially, of a head, a roughened or corrugated shank adjacent to said head, a sharpened point, and a series of grooves (concentric or helical, as desired) extending rearwardly from said point, said grooves being integrally formed in the stock and having a greater diameter than the normal diameter of the wire, all as will be more fully hereinafter set forth and claimed.

Heretofore, so far as I am aware, wire nails of this class have been unprovided with grooves or helices whose diameter exceeded that of the wire or stock from which the nail is formed.

The object of my invention is to produce a much stronger nail by reason of such enlargement, such nails also, when in use, possessing greater holding-power, as well as being more difficult of withdrawal.

In order to fully illustrate my improvement I have prepared the accompanying sheet of drawings, in which—

Figure 1:
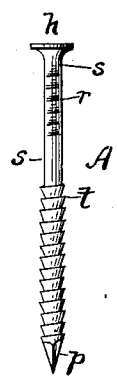
Figure 2:
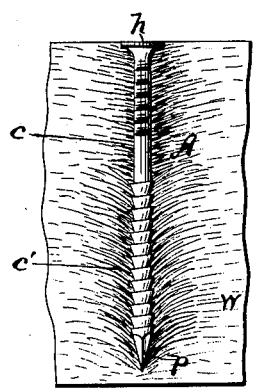
Figure 3:
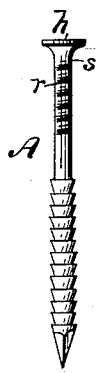
Figure 4:
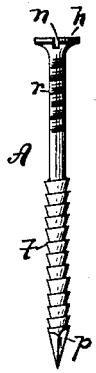
Figure 5:
Figure 6:
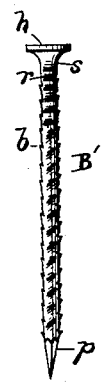
Figure 7:
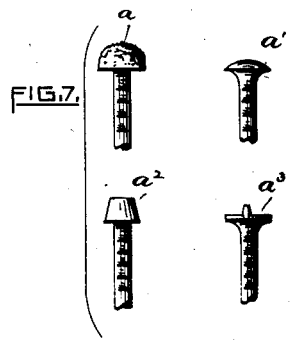

Figure 1 represents a perspective view of the nail complete. Fig. 2 is a similar view of the nail driven into wood, the latter being shaded to indicate the manner in which the fibers engage the enlarged grooved portion of the nail, thereby in a greater degree preventing its withdrawal. Fig. 3 is a perspective view of the nail having a series of enlarged concentric grooves or barbs formed therein. Fig. 4 represents the nail provided with a slotted or nicked head, thereby adapting the nail to be withdrawn by means of a screwdriver. Figs. 5 and 6 represent the usual form of wire nails, and Fig. 7 represents various shapes of nail-heads adapted to be formed on my improved nail.

B, Fig. 5, as before stated, indicates a common form of wire nail, the same consisting of a head, the smooth shank $s$, roughened at $r$ adjacent to the head, and the sharpened point $p$. B', Fig. 6, indicates a similar nail, but having its shank roughened or slightly barbed throughout its length by a series of indentations, $b$. Both said nails B B' are objectionable, owing to the fact that they can be readily withdrawn from the wood, the same being true, although, in a lesser degree, of a nail having a coarse screw-thread of uniform diameter with that of the plain shank portion thereof.

My present improved nail may be described as follows:

A, again referring to the drawings, designates the nail complete formed from steel wire, although iron and brass or other metals may be substituted, if desired. Said improved nail A comprises a head, a sharpened point, and a roughened shank adjacent to the head, substantially like the common nail B, before referred to. The essential difference between the former and latter named nail consists in forming an enlarged spiral or a series of grooves on the nail A, said formation extending rearwardly from the point and being considerably larger in diameter than the normal diameter of the wire $s$ or rod from which the nail is cut. The first four figures represent forms of grooves and spiral, $t$, which I prefer using. I, however, would not restrict myself to the exact form shown, as other styles may be employed without departing from the spirit of the invention. The enlarged portion of the nail is about two sizes or numbers larger in diameter than the normal diameter of the wire $s$.

By means of my improvement the nail may be readily driven into the wood, as at $w$, Fig. 2; but any attempt to withdraw it therefrom is resisted by the enlarged portion of the thread or groove, as the case may be, the fibers, $c'$, of the wood adjacent to said enlargement being deflected to a greater degree than are the fibers $c$, immediately surrounding the plain portion of the nail-shank, all as clearly indicated in said Fig. 2.

For the purpose of adapting the nail A to be withdrawn, a nick, n, Fig. 4, is formed in its head. I would not limit myself, however, to the form of head therein shown, as other forms may be adopted—as, for example, the heads represented in Fig. 7. In lieu of said nick n, a projection or other equivalent means may be employed, as indicated at $a^3$ in Fig. 7; or a countersunk head having one or more cross-bars may be used, as indicated in Rogers patent, No. 255,459, of March 28, 1882.

The mechanism for making my improved wire nails is not illustrated, as it forms no part of the invention claimed herewith. An example of machinery adapted to roll the enlarged thread or grooves upon the wire is shown in Horvey's patent, No. 329,900, of November 10, 1885.

I do not claim, broadly, as my invention a wire nail provided with a thread or grooves and adapted to be driven into wood by means of a hammer; but What I do claim, and desire to secure by United States Letters Patent, is—

1. The improved wire nail hereinbefore described, consisting of a head, the roughened shank adjacent to the head, a sharpened point, and the enlarged ratchet-shaped grooves or spiral formed on the body or shank thereof, substantially as set forth.

2. The improved wire nail hereinbefore described, consisting of a head adapted to receive a screw-driver, the roughened shank adjacent to said head, a sharpened point, and a helical groove or grooves extending rearwardly from said point, integrally formed on the shank and having the outer diameter of said groove somewhat larger than the normal diameter of the wire, for the purpose specified.

In testimony whereof I have affixed my signature in presence of two witnesses.

CHARLES D. ROGERS.

Witnesses:
WM. R. DUTEMPLE,
GEO. H. REMINGTON.